United States Patent
Chun et al.

(10) Patent No.: US 10,615,485 B2
(45) Date of Patent: Apr. 7, 2020

(54) PORTABLE TERMINAL WITH ANTENNA DEVICE FOR DISPLAY ELEMENT OR DISPLAY ASSEMBLY INCLUDING FLEXIBLE FUNCTIONAL REGION

(71) Applicant: Samsung Electronics Co., Ltd., Suwon-si, Gyeonggi-do (KR)

(72) Inventors: Jae-Bong Chun, Suwon-si (KR); Jin-Woo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/998,479

(22) Filed: Aug. 16, 2018

(65) Prior Publication Data

US 2018/0358684 A1 Dec. 13, 2018

Related U.S. Application Data

(63) Continuation of application No. 14/082,900, filed on Nov. 18, 2013, now Pat. No. 10,079,425.

(30) Foreign Application Priority Data

Feb. 25, 2013 (KR) ........................ 10-2013-0019585

(51) Int. Cl.
*H01Q 1/22* (2006.01)
*H01Q 1/24* (2006.01)
(Continued)

(52) U.S. Cl.
CPC ............... *H01Q 1/22* (2013.01); *H01Q 1/243* (2013.01); *H01Q 1/44* (2013.01); *H01Q 21/28* (2013.01)

(58) Field of Classification Search
CPC ............ H01Q 1/243; H01Q 1/22; H01Q 1/44; H01Q 21/28; H01Q 5/378; H01Q 5/392; G06F 1/1652
See application file for complete search history.

(56) References Cited

U.S. PATENT DOCUMENTS 6,806,835 B2 * 10/2004 Iwai .................. H01Q 1/08
343/702
7,508,349 B2 * 3/2009 Kanazawa ............. H01Q 1/243
343/702
(Continued)

FOREIGN PATENT DOCUMENTS

KR 10-2005-0023203 A 3/2005
KR 10-0818170 B1 4/2008
(Continued)

OTHER PUBLICATIONS

Korean Office Action dated Mar. 11, 2019, issued in a counterpart Korean application No. 10-2013-0019585.

*Primary Examiner* — Dameon E Levi
*Assistant Examiner* — Jennifer F Hu
(74) *Attorney, Agent, or Firm* — Jefferson IP Law, LLP

(57) ABSTRACT

A portable terminal is provided. The portable terminal includes a flexible display element, a first antenna element disposed at a first region on the display element, a second antenna element disposed at a foldable second region on the display element to face the first region, and a switch element configured to selectively connect the second antenna element. When the display element is folded or rolled, the first and second antenna elements at least partially overlap each other, and the switch element disconnects the second antenna element. The portable terminal including the antenna device as described above may maintain a stable transmission/reception performance although it includes a flexible display element or a display assembly. When a plurality of antenna elements are provided, the portable terminal may implement a Multiple Input Multiple Output (MIMO) antenna device in a state where the display element is extended.

17 Claims, 10 Drawing Sheets

(51) Int. Cl.
    *H01Q 1/44*         (2006.01)
    *H01Q 21/28*      (2006.01)

(56) References Cited

U.S. PATENT DOCUMENTS

| | | | | |
|---|---|---|---|---|
| 8,060,167 | B2* | 11/2011 | Saitou | H01Q 1/243 |
| | | | | 455/550.1 |
| 2006/0050169 | A1* | 3/2006 | Misawa | G06F 1/1616 |
| | | | | 348/333.06 |
| 2008/0106477 | A1* | 5/2008 | Mashima | H01Q 1/243 |
| | | | | 343/702 |
| 2010/0013720 | A1* | 1/2010 | Sakata | H01Q 1/243 |
| | | | | 343/702 |
| 2010/0328171 | A1* | 12/2010 | Mak | H01Q 1/273 |
| | | | | 343/720 |
| 2012/0133621 | A1* | 5/2012 | Kim | H04M 1/0206 |
| | | | | 345/204 |
| 2013/0009849 | A1* | 1/2013 | Ohguchi | H01Q 1/243 |
| | | | | 343/893 |
| 2013/0135150 | A1* | 5/2013 | Kenoun | H01Q 9/0421 |
| | | | | 343/700 MS |

FOREIGN PATENT DOCUMENTS

| | | |
|---|---|---|
| KR | 10-2008-0045864 A | 5/2008 |
| KR | 10-2010-0041554 A | 4/2010 |
| KR | 10-2012-0056512 A | 6/2012 |

\* cited by examiner

PORTABLE TERMINAL WITH ANTENNA DEVICE FOR DISPLAY ELEMENT OR DISPLAY ASSEMBLY INCLUDING FLEXIBLE FUNCTIONAL REGION

CROSS-REFERENCE TO RELATED APPLICATION(S)

This application is a continuation application of prior application Ser. No. 14/082,900, filed on Nov. 18, 2013 and was based on and claimed the priority under 35 U.S.C § 119(a) of a Korean patent application 10-2013-0019585, filed on Feb. 25, 2013 in the Korean Intellectual Property Office, the entire disclosure of which is incorporated by reference herein in its entirety.

BACKGROUND OF THE INVENTION

1. Field of the Invention

The present invention relates to an antenna device for a portable terminal. More particularly the present invention relates to an antenna device mounted on a display element with a flexible functional region.

2. Description of the Related Art

Typically, the term "portable terminal" refers to a device that allows a user to perform a communication function with another user while the user is carrying the portable device. Examples of such communication functions include a voice communication or short message transmission, a data communication function such as the Internet, mobile banking, multimedia file transmission, an entertainment function such as a game, music, or moving image reproduction, and the like. Previously, portable terminals were specialized to perform one of a communication function, a game function, a multimedia function, an electronic scheduler function, etc. However, owing to the development of electric/electronic technologies and communication technologies, it has become possible to implement various functions using a single mobile communication terminal.

As the use of mobile communication terminals is popularized, efforts are continuously made to implement a vehicle or home appliance control function, a transportation fee payment function, a security function, or the like in addition to a communication function through a communication service supplier using a single mobile communication terminal by incorporating a Wireless Local Area Network (WLAN) or Near Field Communication (NFC) function into the mobile communication terminal. Accordingly, the incorporation of various antenna devices into portable terminals is required which are represented by mobile communication terminals. That is, since a mobile communication service, a WLAN communication, and an NFC communication are performed at different frequency bands, an antenna device is required for each communication frequency band.

Further, as the wireless mobile communication is recently turned into the fourth generation system which is represented by Wibro or Long Term Evolution (LTE), a super high speed broadband antenna device is required. Accordingly, portable terminals will require high performance antenna devices with the development of communication technologies. On the other hand, when considering portability, the miniaturization and lightening of portable terminals are essentially required. In addition, as multimedia services through portable terminals are vitalized, a display element capable of providing a screen of a sufficiently large size, which is contradictory to the miniaturization and lightening of portable terminals, is also required.

Recently, research on the commercialization of a display element or a display assembly (hereinafter, referred to as a "flexible display element") including a flexible functional region are being actively carried out. A flexible display element is useful for securing portability while providing a sufficiently large screen since it may be carried by folding or rolling it in a cylindrical shape or the like. Meanwhile, in the fourth generation mobile communication system, the incorporation of a super high speed broadband antenna device into portable terminals is required. A Multiple Input Multiple Output (MIMO) antenna device is configured such that a plurality of antennas use the same frequency and independently transmit/receive a signal. Such a MIMO antenna device may innovatively increase transmission speed depending on the number of transmittable/receivable antenna elements, i.e., radiators.

However, when a plurality of antenna elements are disposed in a portable terminal provided with a flexible display element, the positions of the antenna elements when the flexible display element is folded or rolled may change. Accordingly, there is a disadvantage in that the transmission/reception performance of the entire antenna device cannot be constantly maintained. That is, antenna devices are usually designed in a condition where transmission/reception is carried out in a state where the display element is extended. However, since the display element and hence the entirety of the portable terminal may be folded or rolled, the operation environment of the antenna device is varied, and thus, the transmission/reception performance of the antenna device may deteriorate. Further, there is a problem in that, when antenna elements that form the MIMO antenna overlap each other in the folded state, the performance deterioration of the antenna device becomes more serious.

Accordingly, there is a need for an improved antenna element combined with a display element or a display assembly in which the performance of the antenna element is prevented from deteriorating even if the display element or the display assembly changes its shape.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a portable terminal in which an antenna element is combined with a display element or a display assembly including a flexible function region such that the performance of the antenna element is prevented from deteriorating even if the display element or the display assembly changes the shapes.

Another aspect of the present invention is to provide a portable terminal which provides a Multiple Input Multiple Output (MIMO) environment while the portable terminal is being used in a state where a display element or a display assembly is in an extended state, and allows only a minimum number of antenna elements required for maintaining a transmission/reception state to be operated in a state where the portable terminal is folded or rolled to be carried.

In accordance with an aspect of the present invention, a portable terminal is provided. The portable terminal includes a flexible display element, a first antenna element disposed at a first region on the display element, a second antenna element disposed at a foldable second region on the display element to face the first region, and a switch element configured to selectively connect the second antenna element. When the display element is folded or rolled, the first and second antenna elements at least partially overlap each other, and the switch element disconnects the second antenna element.

In accordance with another aspect of the present invention, a portable terminal is provided. The portable terminal includes a display assembly including a flexible display element that is capable of being folded or rolled by having flexibility, and an antenna element disposed on a side of the display element. The antenna element extends to be inclined in relation to the longitudinal direction of the display element or is formed by a radiation pattern of a step shape or a meander line shape.

In accordance with yet another aspect of the present invention, a portable terminal is provided. The portable terminal includes a display assembly including a flexible display element, a first antenna element disposed at a first region on the display element, and a second antenna element disposed at a foldable second region on the display element to face the first region. When the display element is folded or rolled, the first and second antenna elements are disposed in parallel to each other at positions spaced apart from each other.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
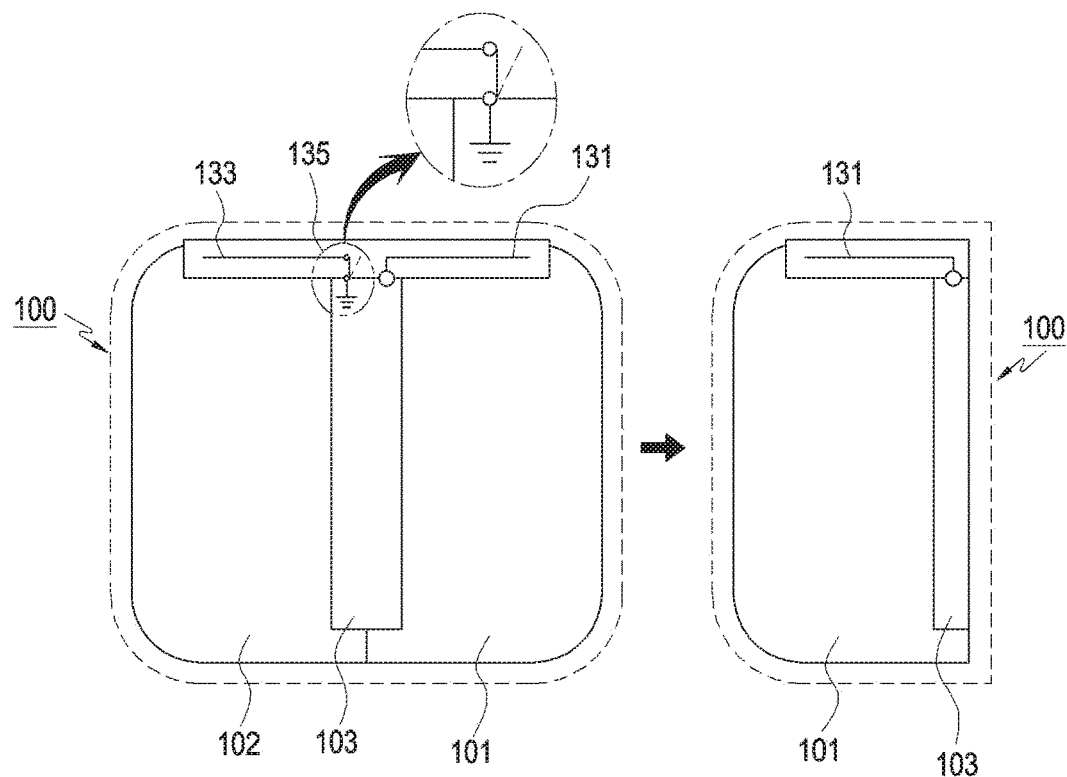
FIG. 1 is a schematic view illustrating a portable terminal provided with an antenna device according to a first exemplary embodiment of the present invention.

FIG. 1 is a schematic view illustrating a portable terminal provided with an antenna device according to a first exemplary embodiment of the present invention.

Referring to FIG. 1, the portable terminal 100 has an antenna device that includes antenna elements 131 and 133 disposed on a flexible display element or on a display assembly including a flexible functional region. In the following detailed description, a configuration in which the antenna elements 131 and 133 are disposed on a flexible display element will be used to describe an exemplary embodiment of the present invention. The portable terminal 100 illustrated in FIG. 1 has the form of a folder-type terminal and the display element includes a first region 101 and a second region 102 which are capable of being folded to face each other. Of course, since the display element is flexible, it is obvious that the display element may be rolled in a cylindrical shape as well as being folded, and may be configured in other shapes besides being folded and rolled.

The antenna elements 131 and 133 include a first antenna element 131 disposed on a side of the display element, more specifically, on a side of the first region 101, and a second antenna element 133 disposed on a side of the second region 102. Each of the first and second antenna elements 131 and 133 extend in the longitudinal direction of the display element. At this time, a circuit board 103 is provided in the central part of the display element. The circuit board 103 is preferably made of a flexible material like that of the display element. However, the circuit board 103 may be made of an inflexible material according to, for example, a position where the circuit board 103 is installed. Each of the first and second antenna elements 131 and 133 extend in a direction facing away from the circuit board 103. As illustrated in FIG. 1, in a state where the display element is folded, the first and second antenna elements 131 and 133 may at least partially overlap each other.

The first and second antenna elements 131 and 133 operate independently from each other at the same frequency band, thereby implementing a Multiple Input Multiple Output (MIMO) antenna. However, the second antenna element 133 is connected to a ground provided on the circuit board 103 through a switch element 135, and the first antenna element 131 is directly connected to a communication circuit provided on the circuit board 103. Accordingly, the second antenna element 133 may not carry out a transmission/reception operation according to the control of the portable terminal 100, more specifically, according to the operation of the switch element 135. Of course, when the first and second antenna elements 131 are 133 connected, the second antenna element 133 may also be directly connected to the communication circuit. That is, both the first and second antenna elements 131 and 133 may be connected to the communication circuit, more specifically, to a power feeding unit of the communication circuit to be independently operated.

The first antenna element 131 remains connected to the circuit board 103 irrespective of whether the display element is folded. Whereas, the second antenna element 133 is connected to the ground provided on the circuit board 103 or to the communication circuit only when the display element is in the extended state to configure a MIMO antenna together with the first antenna element 131. When the display element is in the folded state, the switch element 135 cuts off the connection between the second antenna element 133 and the ground or the communication circuit. Accordingly, when the display element is in the folded state, the antenna device is configured as a monopole antenna that is formed only by the first antenna element 131.

The switch element 135 maintains or cuts off the connection between the second antenna device 133 and the ground or the communication circuit depending on whether the display element is folded. In an exemplary implementation, switch element 135 is a Single Pole Double Throw (SPDT) antenna switch. However, switch element 135 may be replaced with other types of switches. For example, when a hinge device is provided to allow the portable terminal 100 to be foldable, a switch may be implemented that executes a physical connection according to the opening/closing angle of the hinge device. Meanwhile, when the SPDT antenna switch is provided as the switch element 135, a means is required that determines whether the display element, and hence the portable terminal 100, is folded. As an exemplary means that determines whether the portable terminal 100 is folded, a combination of a magnetic body and a hole sensor may be used as in a folder-type terminal of the related art. The hole sensor detects the magnetic force of the magnetic body to determine whether the portable terminal 100 is folded, and through this, may control the switch element 135. Alternatively, a strain gage or the like may be disposed on the flexible display element to detect whether the display element is folded and the extent of flexural deformation. By detecting whether the display element is folded and the extent of flexural deformation through a sensor such as a strain gage, a screen may be controlled and when the display element is excessively deformed, an alarm signal may be produced. Based on the deformation of the display element sensed by a sensor such as a strain gage, the opening/closing of the switch element 135 may be controlled.

A purpose of switch element 135 is to disconnect the second antenna element 133 from the ground or the communication circuit when the display element is in the folded state. This is because, when the second antenna element 133 remains connected to the ground or the communication circuit when the display element is in the folded state, the entire performance of the antenna device is substantially degraded.

Table 1 below represents results obtained by measuring performance antenna efficiency, mean gain, peak gain, and directivity of the antenna device when the display element is in the folded state. In Table 1, "GND close" means a state where the second antenna element 133 is connected to the ground of the circuit board 103 when the display element is in the folded state, and "GND open" means a state where the connection between the second antenna element 133 and the ground of the circuit board 103 is cut off when the display element is in the folded state. Of course, the first antenna element 131 remains fixedly connected to the communication circuit configured on the circuit board 103 regardless of whether the display element is folded. In addition, in Table 1, "Freq." means frequency, "Eff." means efficiency, "Ave. gain" means mean gain, "Peak gain" means peak gain, and "Dir." means directivity.

As indicated in Table 1, when the second antenna element 133 remains connected to the ground when the display element is in the folded state, the antenna efficiency and gain may be sharply reduced at a certain frequency band so that the communication function may be practically lost. Whereas, it can be seen that although it may differ depending on the frequency band, a portable terminal to which an exemplary antenna device according to the present invention is applied may secure a generally stable transmission/reception performance even when the display element is in the folded state while implementing a MIMO antenna device. This is because when the display element is in the folded state, the connection between the second antenna element 133 and the ground is cut off using the switch element 135 so that the first antenna element 131 operating independently from the second antenna element 133 may carry out the operation that satisfies the design requirement.

TABLE 1

|  | GND close | | | | GND open | | | |
| --- | --- | --- | --- | --- | --- | --- | --- | --- |
| Freq. (MHz) | Eff. (%) | Ave. gain (dB) | Peak gain (dB) | Dir. | Eff. (%) | Ave. gain (dB) | Peak gain (dB) | Dir. |
| 824 | 2 | −17.50 | −15.80 | 1.70 | 50 | −3.02 | 0.05 | 3.07 |
| 837 | 1 | −18.60 | −16.60 | 2.00 | 60 | −2.24 | 0.77 | 3.01 |
| 849 | 1 | −20.50 | −18.50 | 2.00 | 67 | −1.71 | 1.28 | 2.99 |
| 869 | 1 | −20.10 | −15.80 | 4.30 | 70 | −1.55 | 1.36 | 2.91 |
| 881 | 1 | −18.50 | −13.30 | 5.20 | 73 | −1.39 | 1.50 | 2.89 |
| 894 | 2 | −16.50 | −11.50 | 5.00 | 70 | −1.52 | 1.32 | 2.84 |
| 1710 | 29 | −5.40 | −1.07 | 4.33 | 26 | −5.33 | 0.25 | 5.68 |
| 1745 | 31 | −5.06 | −0.66 | 4.40 | 29 | −5.31 | 0.08 | 5.39 |
| 1785 | 54 | −2.69 | 2.13 | 4.82 | 53 | −2.77 | 2.36 | 5.13 |
| 1805 | 39 | −4.11 | 0.82 | 4.93 | 39 | −1.14 | 0.83 | 4.97 |
| 1840 | 46 | −3.34 | 1.72 | 5.06 | 48 | −3.17 | 1.53 | 4.70 |
| 1880 | 64 | −1.92 | 3.15 | 5.07 | 66 | −1.81 | 2.87 | 4.68 |
| 1920 | 59 | −2.30 | 2.75 | 5.05 | 64 | −1.95 | 3.08 | 5.03 |
| 1950 | 52 | −2.85 | 2.30 | 5.15 | 56 | −2.53 | 2.82 | 5.35 |
| 1980 | 58 | −2.38 | 3.01 | 5.39 | 64 | −1.57 | 3.54 | 5.91 |
| 2110 | 60 | −2.22 | 3.51 | 5.73 | 70 | −1.57 | 5.18 | 6.75 |
| 2140 | 63 | −2.02 | 3.33 | 5.35 | 73 | −1.29 | 5.34 | 6.73 |
| 2170 | 51 | −2.93 | 1.98 | 4.91 | 60 | −2.23 | 4.36 | 6.59 |

The measurement of the antenna performance of Table 1 was performed using an antenna device in which the switch element 135 is configured to connect the second antenna element 133 to the ground or cut off the connection. However, as described above, the switch element 135 may be configured to connect the second antenna element 133 and the communication circuit or cut off the connection.

Figure 2:
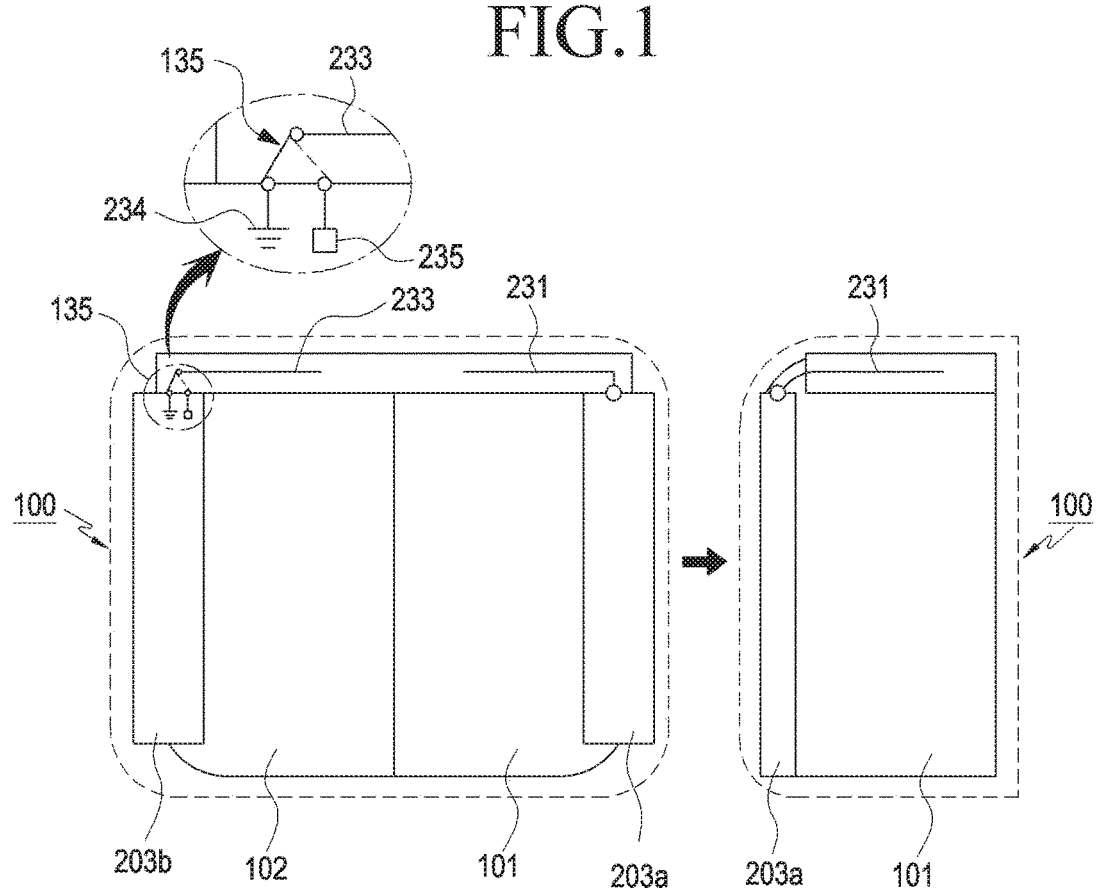
FIG. 2 is a schematic view illustrating a modified example of the portable terminal illustrated in FIG. 1 according to an exemplary embodiment of the present invention.
Figure 3:
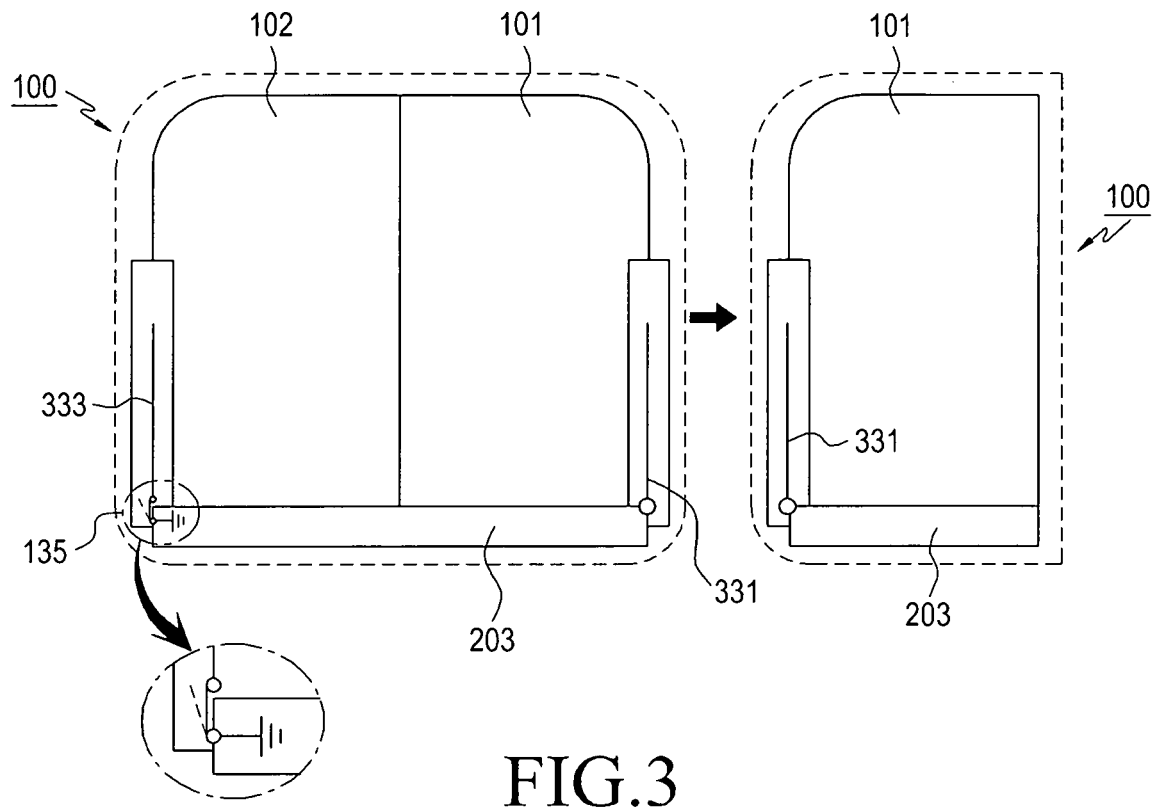
FIG. 3 is a schematic view illustrating another modified example of the portable terminal illustrated in FIG. 1 according to an exemplary embodiment of the present invention.
Figure 4:
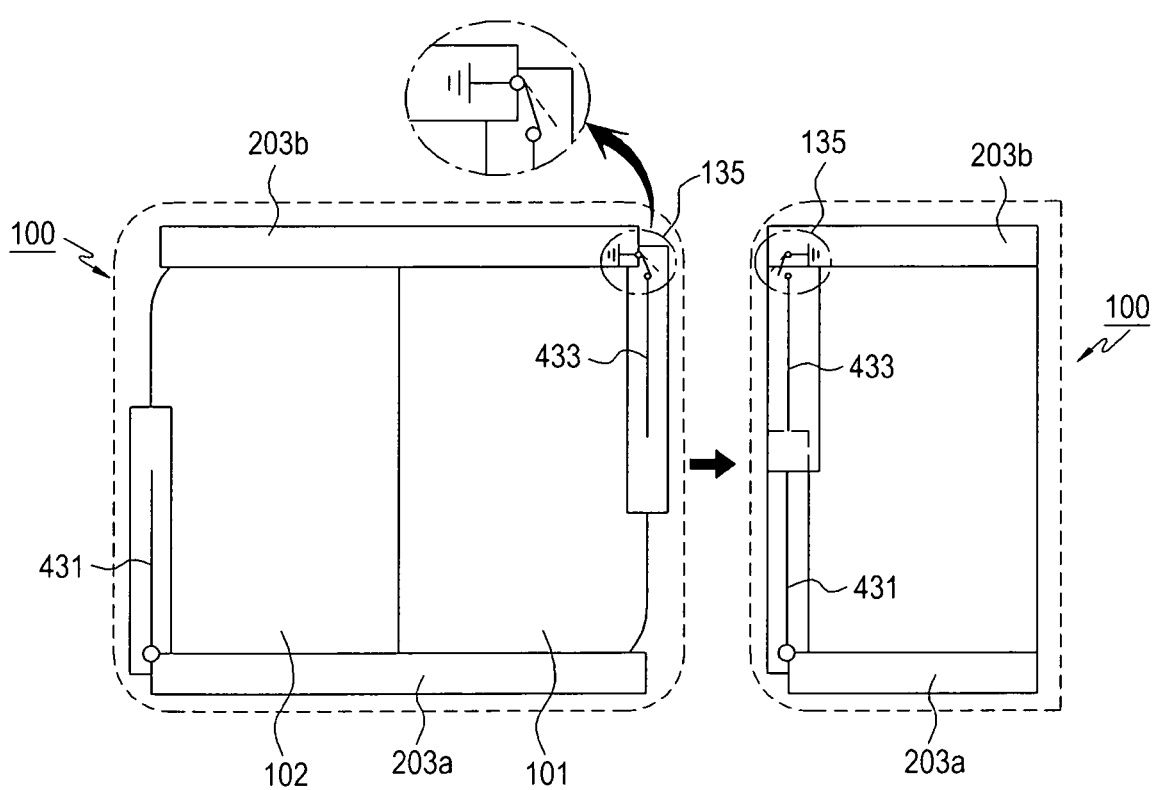
FIG. 4 is a schematic view illustrating still another modified example of the portable terminal illustrated in FIG. 1 according to an exemplary embodiment of the present invention.

FIGS. 2 to 4 are schematic views illustrating modified examples of the portable terminal including the antenna device as illustrated in FIG. 1 according to exemplary embodiments of the present invention.

Referring to FIG. 2, the opposite ends of the display element are provided with circuit boards 203a and 203b, respectively, in which it is exemplified that the first and second antenna elements 231 and 233 are disposed on one side of the display element. In the circuit boards 203a and 203b, the first antenna element 231 extends from the first circuit board 203a provided at one end of the display element, and the second antenna element 233 extends from the second circuit board 203b provided at the other end of the display element. At this time, the first and second antenna elements 231 and 233 extend so as to approach each other. Meanwhile, the first circuit board 203a is provided with a communication circuit to be fixedly connected to the first antenna device 231, and the second circuit board 203b is provided with a ground 234. An element 135 is provided between the second circuit board 203b and the second antenna element 233 to selectively connect the second antenna element 233 to the ground 234 of the second circuit board 203b depending on the deformation of the display element. However, as in the prior exemplary embodiment, the second circuit board 203b may provide a communication circuit 235 connected to the second antenna element 233, and the switch element 135 may be configured to connect or cut off the second antenna element 233 and the communication circuit 235. In other exemplary embodiments to be described below, it will be descried that a switch element 135 connects or cuts off an antenna element 233 and a ground 234. However, as described above, it is obvious that in a configuration of the inventive antenna device, the switch element 135 may be installed not only between an antenna element 233 and a ground 234 but also between an antenna element 233 and a communication circuit 235.

FIG. 3 exemplifies a configuration in which a circuit board 203 extending in the longitudinal direction of the display element is disposed on one side of the display unit, and the first and second antenna elements 331 and 333 extend from the opposite ends of the circuit board 203, respectively. At this time, the first antenna element 331 is positioned at one end of the display element, and the second antenna element 333 is positioned at the other end of the display element. The second antenna element 333 is connected with the ground provided on the circuit board 203, in which the switch element 135 is disposed between the second antenna element 333 and the ground. When the display element is folded or rolled, the first and second antenna elements 331 and 333 may overlap each other.

FIG. 3 illustrates the appearance of the display element before and after being folded, in which, in the folded state, the first and second antenna elements 331 and 333 overlap each other. When the display element is in the folded state, the switch element 135 cuts off the connection between the second antenna element 333 and the ground.

FIG. 4 exemplifies a configuration in which the first and second antenna elements 431 and 433 are disposed at opposite ends of the display element, respectively. The first circuit board 203a is disposed on one side of the display element, and the second circuit board 203b is disposed on the other side of the display element. The first antenna element 431 extends from the first circuit board 203a, and the second antenna element 433 extends from the second circuit board 203b. The first circuit board 203a is provided with a communication circuit to be fixedly connected with the first antenna element 431, and the second circuit board 203b is provided with a ground. The second antenna element 433 is connected with the ground of the second circuit board 203b through the switch element 135.

When the display element is folded, the first and second antenna elements 431 and 433 at least partially overlap each other, in which case, the switch element 135 cuts off the connection between the second antenna element 433 and the ground. As a result, the first and second antenna elements 431 and 433 may be prevented from electrically interfering with each other in the overlapping state, and the first antenna element 431 may perform an operation that satisfies the design requirement.

It shall be noted that the following exemplary embodiments have a configuration similar to that of the described exemplary embodiment, and configurational elements that may be easily understood through the prior exemplary embodiment will be given the same reference numerals or not given any reference numerals and detailed descriptions thereof may be omitted.

Figure 5:
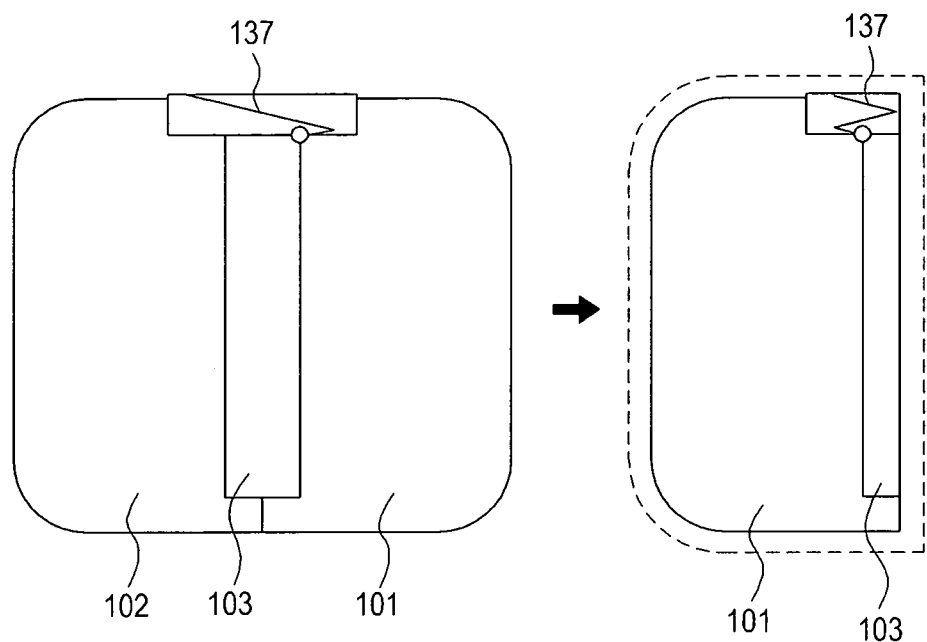
FIG. 5 is a schematic view illustrating a portable terminal provided with an antenna device according to a second exemplary embodiment of the present invention.

FIG. 5 illustrates a portable terminal including an antenna device according to a second exemplary embodiment the present invention.

Referring to FIG. 5, the terminal is provided with only one antenna element 137, and has a pattern where antenna element 137 does not overlap when the flexible display element is in the folded or rolled state.

Figure 9:
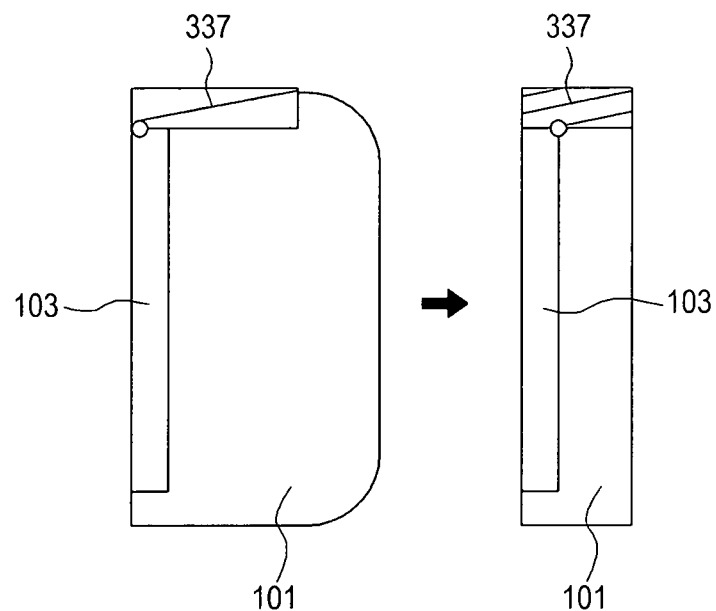
FIG. 9 is a schematic view illustrating another modified example of the portable terminal illustrated in FIG. 5 according to an exemplary embodiment of the present invention.

More specifically, the portable terminal includes a circuit board 103 disposed in the central part of the display element, and the antenna element 137 is disposed on one side of the display element. Since the circuit board 103 is disposed on the display element, the circuit board 103 is flexible such that it can be deformed like the display element. The antenna element 137 is formed in a radiation pattern extending from the circuit board 103 to be inclined in relation to the longitudinal direction of the display element. At this time, in the example illustrated in FIG. 5, the antenna element 137 is formed in a V-shaped radiation pattern which is formed by a first radiation section extending from the circuit board 103 toward one end of the display element, and a second radiation section extending from an end of the first radiation section toward the other end of the display element. At this time, each of the first and second radiation sections extend to be inclined in relation to the longitudinal direction of the display element. Meanwhile, like the configuration as also illustrated in FIG. 9, the antenna element 137 may extend in only one direction from the circuit board 103. Also, the antenna element 137 may be disposed in a zigzag form or a helical form even if the display element is folded or rolled so that the antenna element 137 may prevent overlapping by itself.

Figure 6:
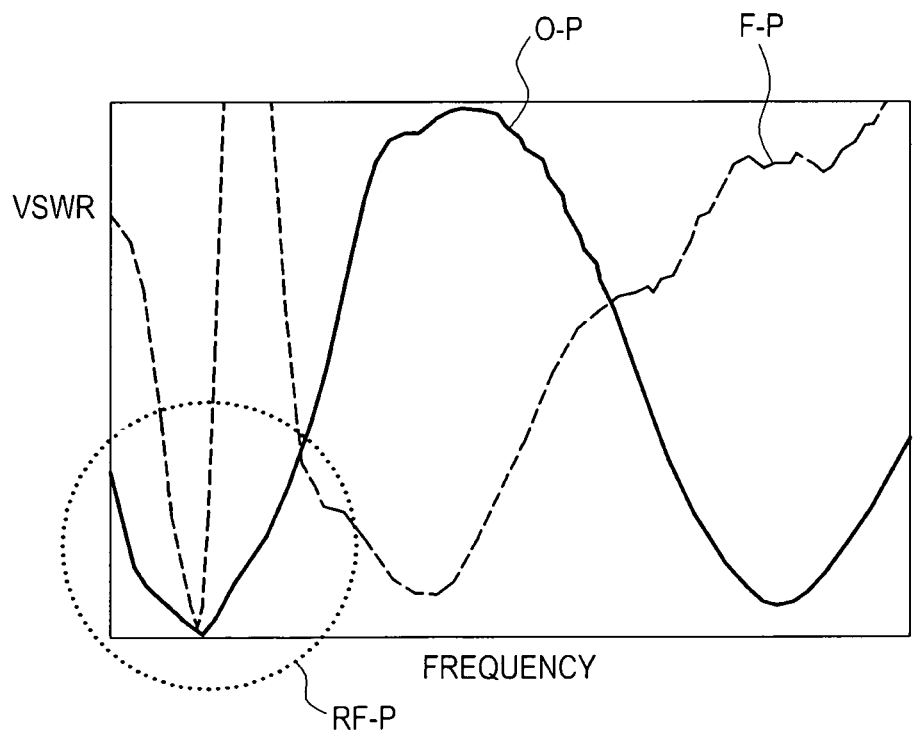
FIG. 6 is a graph representing voltage standing wave ratios of an antenna device of the related art measured before and after a portable terminal including the antenna device mounted on a flexible display element is folded or rolled.

FIG. 6 is a graph representing voltage standing wave ratios of an antenna device of the related art measured before and after a portable terminal including the antenna device mounted on a flexible display element is folded or rolled.

Referring to FIG. 6, the graph denoted by "O-P" represents the voltage standing wave ratio when the display element was in the extended state, and the graph denoted by "F-P" represents the voltage standing wave ratio when the display element was folded and thus, overlapped on the antenna element. In addition, the region denoted by "RF-P" represents the change of the voltage standing wave ratio of the resonance frequency band before and after the display element is folded. As illustrated in FIG. 6, it will be appreciated that when the display element overlaps itself when the display element is folded or rolled in a configuration in which an antenna device is disposed on the flexible display element, the bandwidth at the resonance frequency becomes substantially narrower.

Figure 7:
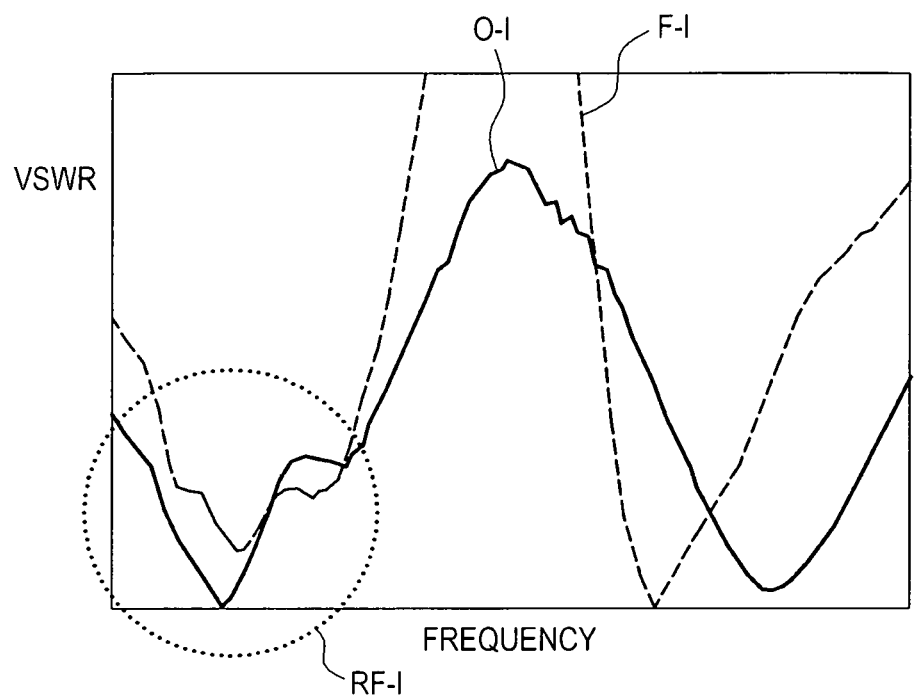
FIG. 7 is a graph representing voltage standing wave ratios of the antenna device of FIG. 5 measured before and after a portable terminal including the antenna device mounted on a flexible display element is folded or rolled according to an exemplary embodiment of the present invention.

FIG. 7 is a graph representing voltage standing wave ratios of the antenna device of FIG. 5 measured before and after a portable terminal including the antenna device mounted on a flexible display element is folded or rolled according to an exemplary embodiment of the present invention.

Referring to FIG. 7, the graph denoted by "O-I" represents the voltage standing wave ratio when the display element was in the extended state, and the graph denoted by "F-I" represents the voltage standing wave ratio when the display element was folded and thus, overlapped the antenna element. In addition, the region denoted by "RF-I" represents the change of the voltage standing wave ratio of the resonance frequency band before and after the display element is folded. As illustrated in FIG. 7, it will be appreciated that when the display element does not overlap itself even when the display element is folded or rolled in a configuration in which an antenna device is disposed on the flexible display element, there is no substantial variation in the characteristic of the voltage standing wave ratio.

Figure 8:
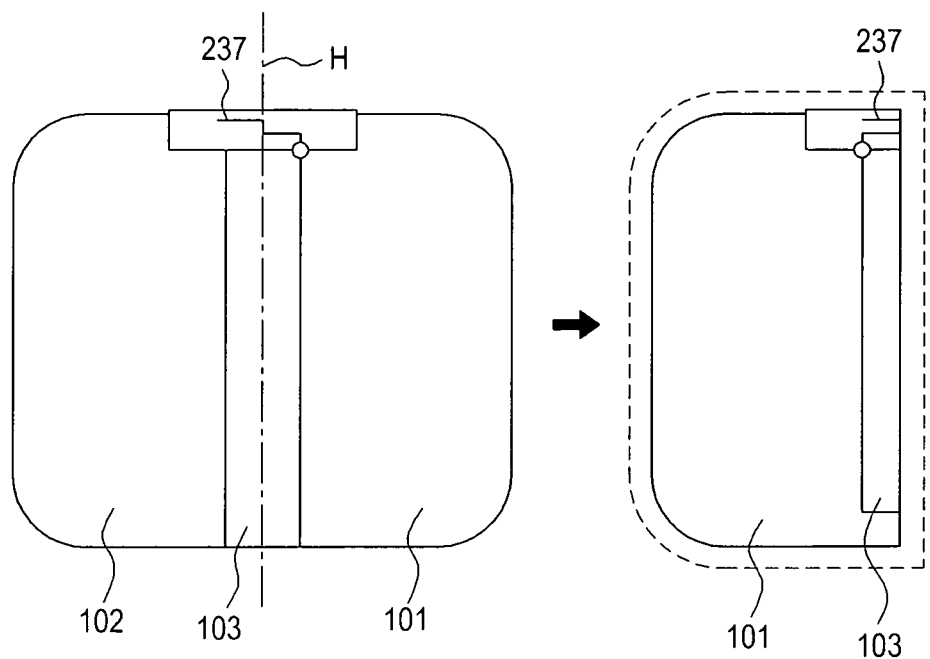
FIG. 8 is a schematic view illustrating a modified example of the portable terminal illustrated in FIG. 5 according to an exemplary embodiment of the present invention.
Figure 12:
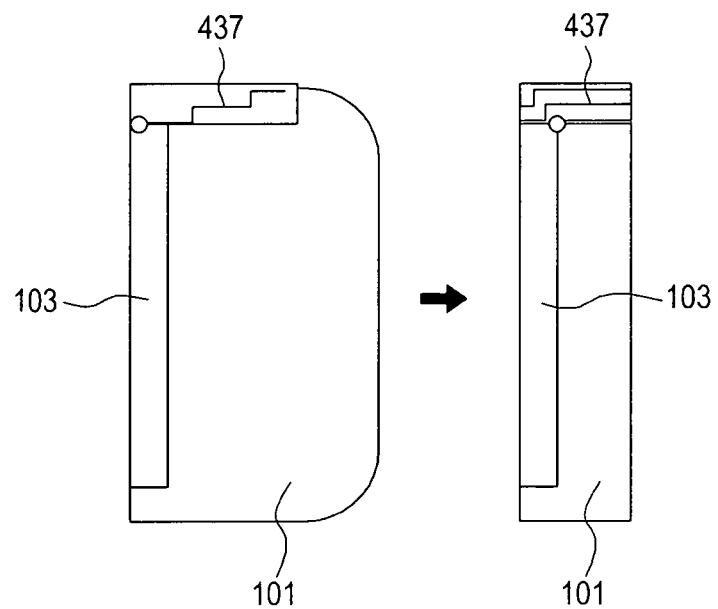
FIG. 12 is a schematic view illustrating another modified example of the portable terminal illustrated in FIG. 5 according to an exemplary embodiment of the present invention.

FIGS. 8, 9 and 12 are schematic views illustrating modified examples of the portable terminal illustrated in FIG. 5 according to exemplary embodiments of the present invention.

Referring to FIG. 8, a circuit board 103 is disposed in the central part of the display element, and an antenna element 237 is formed in a radiation pattern of a step shape extending from the circuit board 103. The display element is capable of being folded on the axis H provided at the center thereof, and the antenna element 237 is disposed across the axis H. At this time, the antenna element 237 is configured in such a manner that a plurality of horizontal radiation sections and vertical radiation sections are alternately disposed substantially in the longitudinal direction of the display element, in which one of the vertical radiation sections is disposed preferably to coincide with the axis H. As one of the vertical radiation sections is disposed to coincide with the axis H, the antenna element 237 may be positioned without overlapping itself even when the display element is folded.

Referring to FIG. 9, a circuit board 103 is disposed at one end of the display element, and an antenna element 337 extends from the circuit board 103 to be inclined in relation to the longitudinal direction of the display element. When the display element is configured to be folded, the antenna element 337 will have a V-shape when the display element is in the folded state. When the display element is configured to be rolled in a cylindrical shape, the antenna element 337 will have a helical shape when the display element is in the rolled state. In FIG. 9, the display element is illustrated in the extended state and in the cylindrically rolled state in which when the display element is in the rolled state, the antenna element 337 takes a thread shape, i.e., a helical shape.

Figure 10:
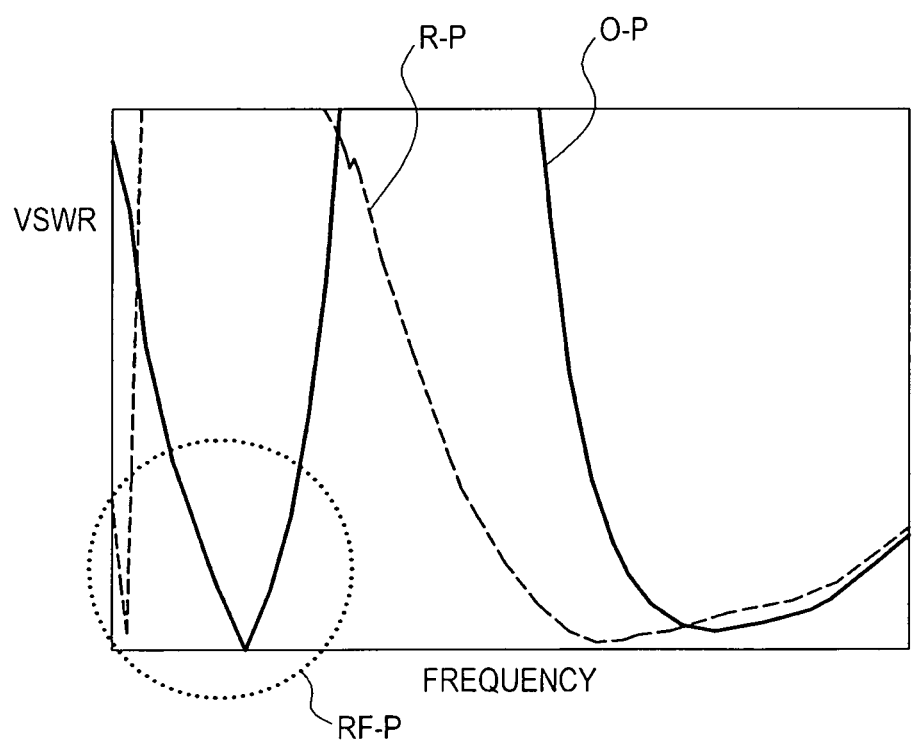
FIG. 10 a graph representing voltage standing wave ratios of an antenna device of the related art measured before and after a portable terminal including the antenna device mounted on a flexible display element is folded or rolled.

FIG. 10 is a graph representing voltage standing wave ratios of an antenna device of the related art measured before and after a portable terminal including the antenna device mounted on a flexible display element is folded or rolled.

Referring to FIG. 10, the graph denoted by "O-P" represents the voltage standing wave ratio when the display element was in the extended state, and the graph denoted by "R-P" represents the voltage standing wave ratio when the display element was rolled and thus, overlapped the antenna element. In addition, the region denoted by "RF-P" represents the change of the voltage standing wave ratio of the resonance frequency band before and after the display element is folded. As illustrated in FIG. 10, it will be appreciated that substantial variation is produced in the resonance frequency when the display element is in the rolled state in the configuration in which an antenna device is disposed on the flexible display element. In this case, it is highly probable that the communication function of the portable terminal may not be normally carried out.

Figure 11:
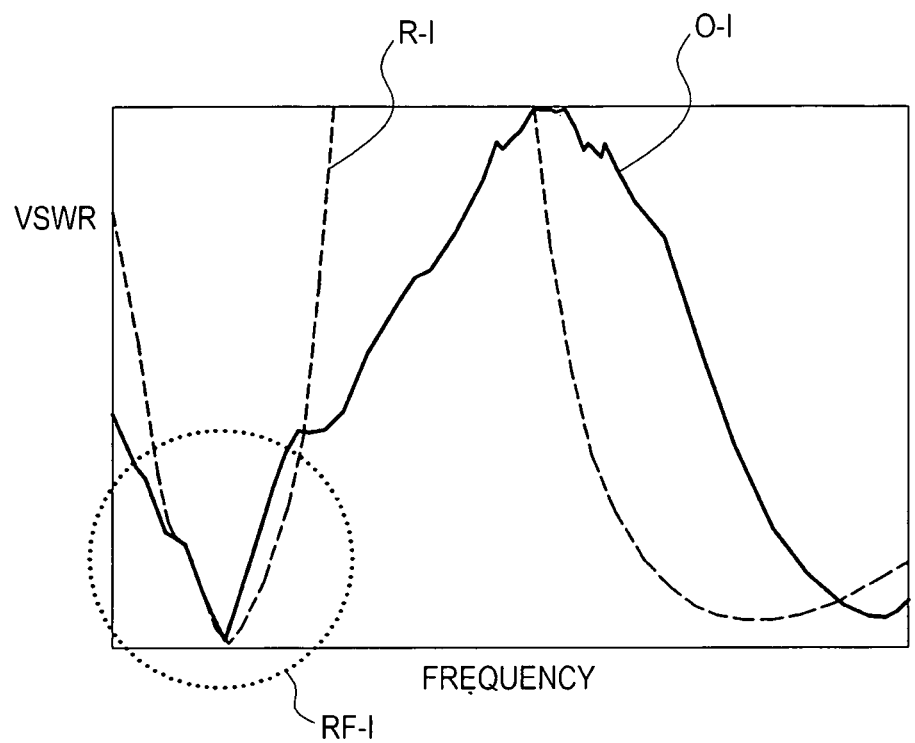
FIG. 11 is a graph indicating voltage standing wave ratios of the antenna device of FIG. 9 measured before and after a portable terminal including the antenna device mounted on a flexible display element is rolled according to an exemplary embodiment of the present invention.

FIG. 11 is a graph indicating voltage standing wave ratios of the antenna device of FIG. 9 measured before and after a portable terminal including the antenna device mounted on a flexible display element is rolled according to an exemplary embodiment of the present invention.

Referring to FIG. 11, the graph denoted by "O-I" represents the voltage standing wave ratio when the display element was in the extended state, and the graph denoted by "R-I" represents the voltage standing wave ratio when the display element was rolled. In addition, the region denoted by "RF-I" represents the change of the voltage standing wave ratio of the resonance frequency band before and after display element is folded. As illustrated in FIG. 11, it will be appreciated that when the display element does not overlap itself even when the display element is rolled in a configuration in which an antenna device is disposed on the flexible display element, there is no substantial variation in the characteristic of the voltage standing wave ratio.

FIG. 12 exemplifies a configuration in which a circuit board 103 is disposed at one end of the display element, and an antenna element 437 is formed in a radiation pattern of a step shape extending from the circuit board 103 and substantially along the longitudinal direction of the display element. When the display element is configured to be folded, it will be desirable that one of the vertical radiation sections of the antenna element 437 is disposed to coincide with a central axis where the display element is folded as described in the descriptions of the prior exemplary embodiments.

In FIG. 12, the rolled form of the display element is also illustrated. Even when the display element is in the rolled state, the antenna element 437 will maintain the step shape extending in parallel along the periphery of the display element, and thus, it is possible to prevent the antenna element 437 from overlapping itself. However, it is noted that the horizontal radiation sections extending in the longitudinal direction of the display element should be set to be smaller than the perimeter when the display element is rolled.

Meanwhile, as described in the prior exemplary embodiments, the inventive portable terminal is configured such that, even when a display element is in the folded or rolled state, an antenna device disposed on the display element can secure the stable antenna performance. However, according to an environment where an antenna element is disposed within the portable terminal, the antenna function may be deteriorated due to the change in the positional relationship of the other components or permittivity when the display element is in the folded or rolled state.

Figure 13:
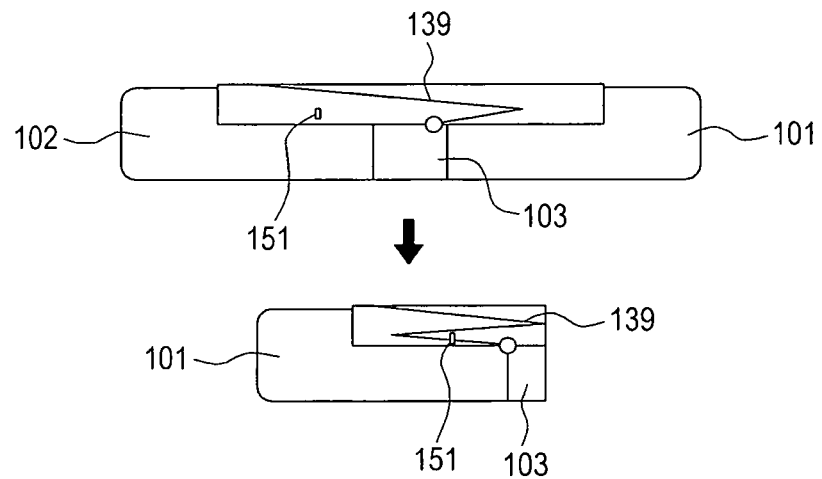
FIG. 13 is a schematic view illustrating a portable terminal provided with an antenna device according to a third exemplary embodiment of the present invention.
Figure 14:
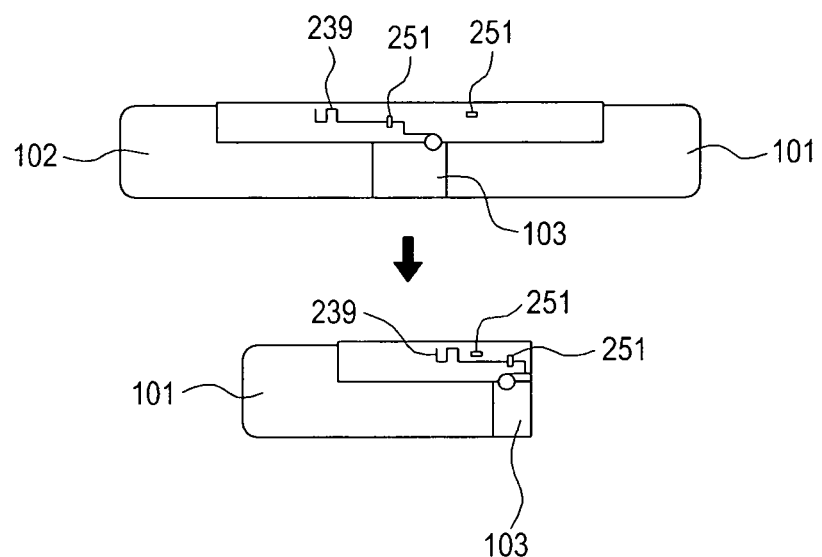
FIG. 14 is a schematic view illustrating a modified example of the portable terminal illustrated in FIG. 13 according to an exemplary embodiment of the present invention.
Figure 15:
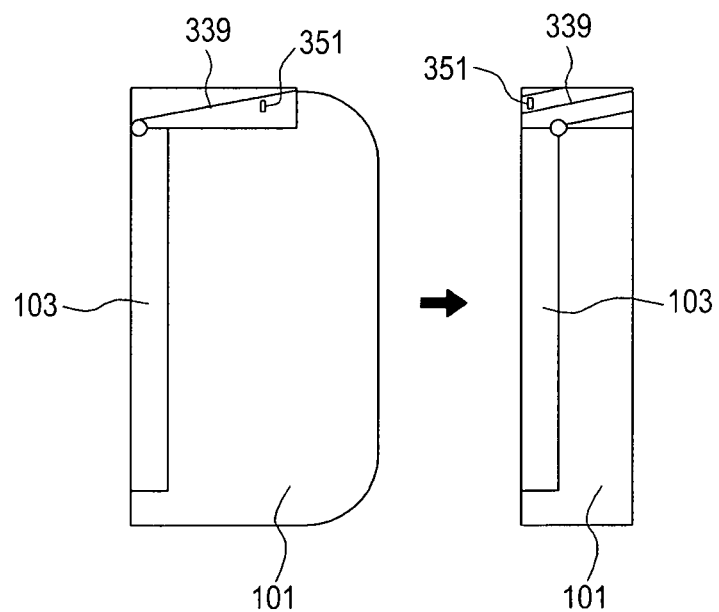
FIG. 15 is a schematic view illustrating another modified example of the portable terminal illustrated in FIG. 13 according to an exemplary embodiment of the present invention.
Figure 16:
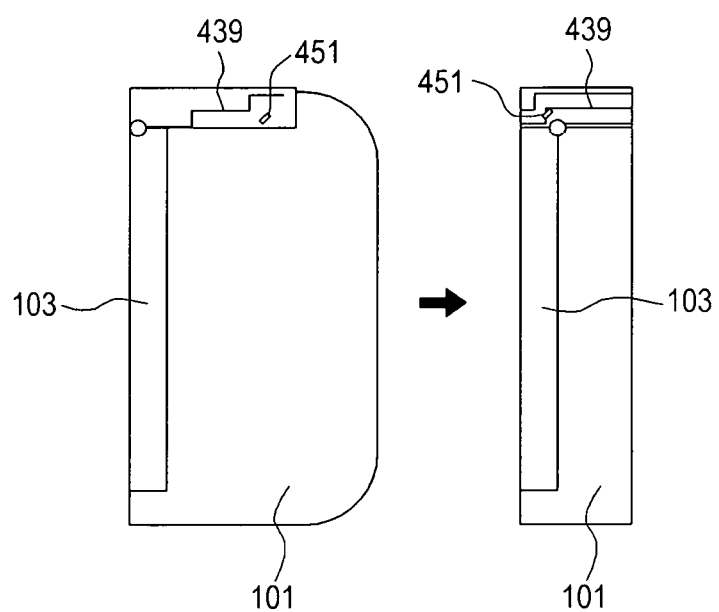
FIG. 16 is a schematic view illustrating still another modified example of the portable terminal illustrated in FIG. 13 according to an exemplary embodiment of the present invention.

FIG. 13 is a schematic view illustrating a portable terminal provided with an antenna device according to a third exemplary embodiment of the present invention and FIGS. 14 to 16 are schematic views illustrating modified examples of the portable terminal illustrated in FIG. 13 according to an exemplary embodiment of the present invention.

FIG. 13 illustrates a configuration in which dummy patterns 151 are added to the portable terminal including the antenna device illustrated in FIG. 5 so that the dummy patterns 151 and the antenna element 139 overlap each other when the display element is folded or rolled. As described above, as the positional relationship is changed between surrounding components such as a substrate when the display element is folded or rolled, a change in permittivity or the like is caused. This causes a change in a characteristic of the antenna device in which the dummy patterns 151 adjust the electrical length of the antenna element 139. As the dummy patterns 151 are disposed such that the electrical length of the antenna element 139 can be adjusted, the antenna device of the terminal can carry out the operation that satisfies the design requirement even when the surrounding environment such as permittivity varies.

FIG. 14 illustrates a configuration in which the antenna element 239 is formed in a radiation pattern in a meander line shape, and dummy patterns 251 are provided on the display element. FIG. 15 illustrates a configuration in which an antenna element 339 extends to be inclined in relation to the longitudinal direction and dummy patterns 351 are added to the portable terminal including the antenna device illustrated in FIG. 9, and FIG. 16 exemplifies a configuration in which an antenna element 439 is formed in a radiation pattern of a step shape and dummy patterns 451 are added to the portable terminal including the antenna device illustrated in FIG. 12.

When the electrical length of the antenna element is adjusted using the dummy patterns, the positions and number of dummy patterns may be variously set according to the operating characteristics of the antenna device required for the portable terminal.

Figure 17:
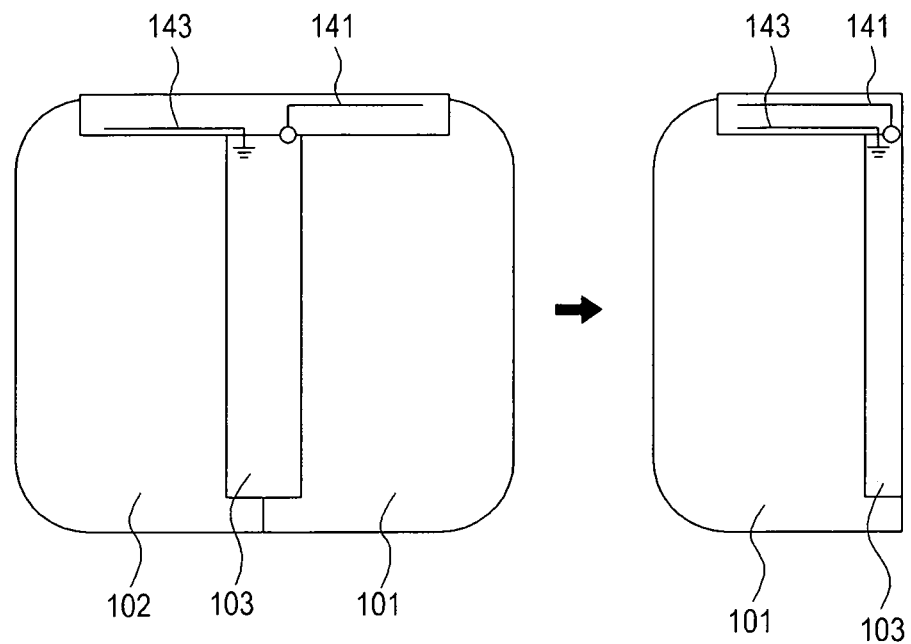
FIG. 17 is a schematic view illustrating a portable terminal provided with an antenna device according to a fourth exemplary embodiment of the present invention.
Figure 18:
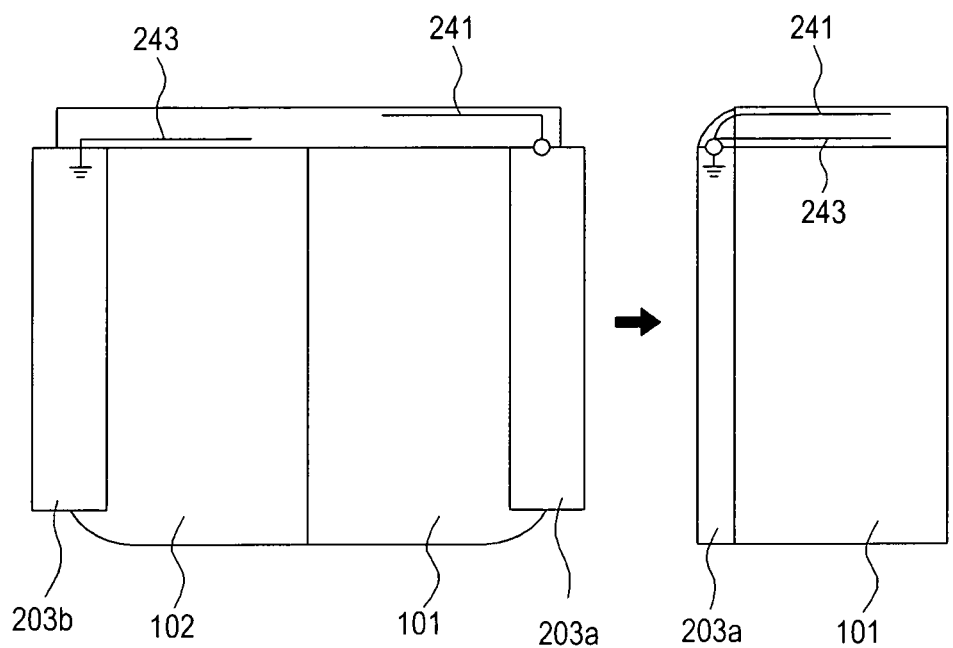
FIG. 18 is a schematic view illustrating a modified example of the portable terminal illustrated in FIG. 17 according to an exemplary embodiment of the present invention.
Figure 19:
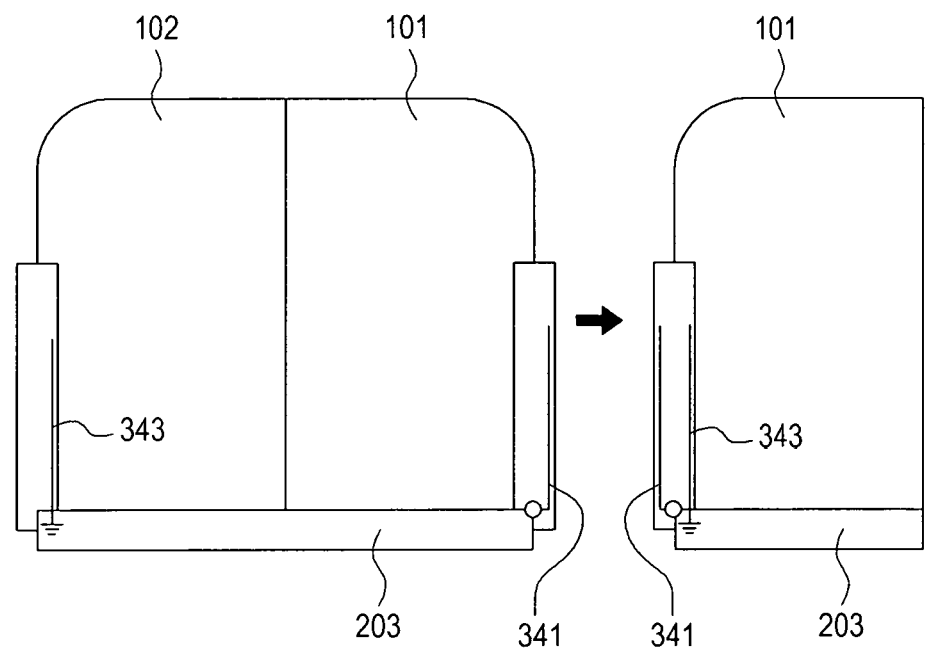
FIG. 19 is a schematic view illustrating another modified example of the portable terminal illustrated in FIG. 17 according to an exemplary embodiment of the present invention.
Figure 20:
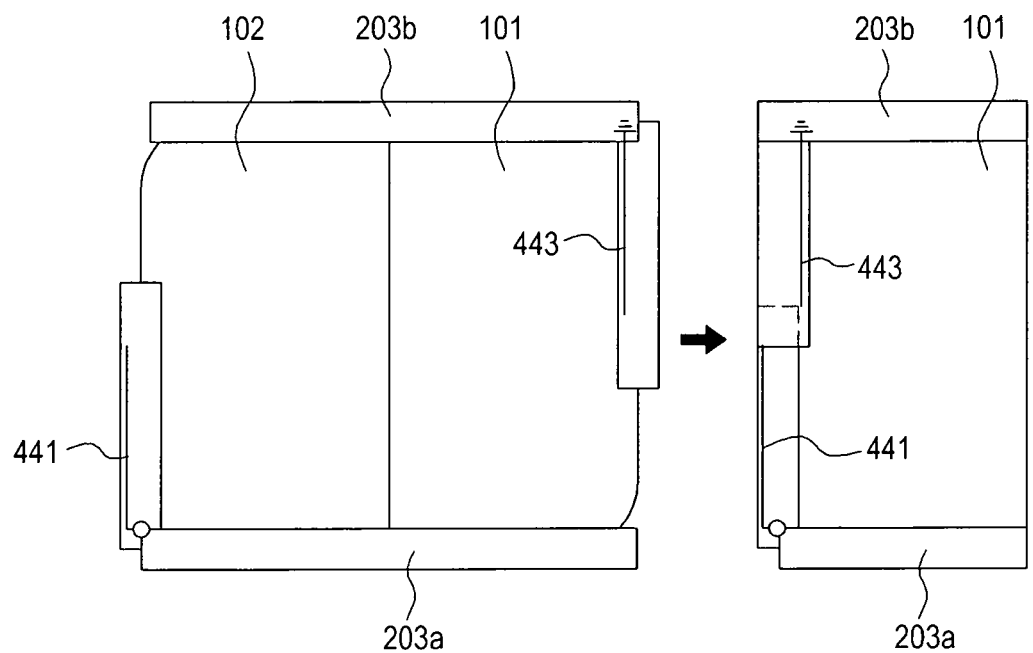
FIG. 20 is a schematic view illustrating still another modified example of the portable terminal illustrated in FIG. 17 according to an exemplary embodiment of the present invention.

FIG. 17 is a schematic view illustrating a portable terminal provided with an antenna device according to a fourth exemplary embodiment of the present invention and FIGS. 18 to 20 are schematic views illustrating modified examples of the portable terminal illustrated in FIG. 17 according to exemplary embodiments of the present invention. More specifically, FIGS. 17 to 20 exemplify configurations in which the antenna characteristics before and after antenna devices are folded or rolled can be stably maintained even if a switch element is not used in the configuration of a portable terminal including an antenna device disposed similarly to the configurations illustrated in FIGS. 1 to 4 and in which the antenna devices illustrated in the drawings are prevented from overlapping each other by differently setting the distances spaced from an edge of the display element when disposing the first and second antenna elements 141, 241, 341, and 441; 143, 243, 343, and 443, respectively. That is, when the display element is in the folded state, the first and second antenna elements 141, 241, 341, and 441; 143, 243, 343, and 443 extend in parallel in the state where they are spaced apart from each other. Accordingly, when the display element is in the folded state, the first and second antenna elements 141, 241, 341, and 441; 143, 243, 343, and 443 operate independently from each other so as to suppress the interference in relation to each other while configuring a MIMO antenna device. The configurations illustrated in FIGS. 17 to 20 are similar to those illustrated in FIGS. 1 to 4 as described above. Thus, further detailed descriptions will be omitted.

As described above, a portable terminal including the inventive antenna device may secure a stable antenna performance according to a deformation of a display element while disposing an antenna element on a flexible display element. In addition, even when a plurality of antenna elements are disposed on a flexible display device, a stable MIMO antenna is implemented in the extended state so that high speed and broadband communication is enabled, and even in the rolled or folded state, a stable communication state can be maintained.

A portable terminal configured as described above may maintain a stable transmission/reception performance even in the folded or rolled state although it is provided with a display element or a display assembly including a flexible functional region. In addition, in a case where a plurality of antenna elements are provided, there is an advantage in that when the flexible display element is in the extended state, the antenna elements may implement a MIMO antenna device in which the antenna elements carry out the transmission/reception operation independently from each other. Even in a case where a plurality of antenna elements are provided, when the display element is in the folded or rolled state, only one of the antenna elements carries out the transmission/reception operation or the antenna elements are positioned to minimize the interference in relation to each other, the stable performance can be maintained. Further, in a case where a dummy pattern is provided, even if antenna elements overlap each other when the display element is in the folded or rolled state, the electrical length of the antenna device may be adjusted using the dummy pattern. Accordingly, the antenna device can maintain the stable performance despite the surrounding permittivity change or the like according to the change of shape of the display element.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The invention claimed is:

1. A portable terminal comprising:
   a flexible display element configured to being folded or rolled and including a first region and a second region which are capable of facing each other when the flexible display element is folded or rolled;
   a first antenna element disposed at the first region;
   a second antenna element disposed at the second region to face the first region; and
   a switch element configured to be selectively articulated to establish a first connection between the second antenna element and a communication circuit and a second connection between the second antenna element and ground of the portable terminal,
   wherein, when the flexible display element is unfolded or unrolled, the switch element is in a closed state and connects the second antenna element to one of the communication circuit or the ground such that the first antenna element and the second antenna element carry out a transmission/reception operation independently from each other, and
   wherein, when the flexible display element is folded or rolled, the first and second antenna elements at least partially overlap each other, and the switch element is in an open state and disconnects the second antenna element from the communication circuit and the ground such that only the first antenna element carries out a transmission/reception operation.

2. The portable terminal of claim 1, wherein the switch element is an electrical element including a Single Pole Double Throw (SPDT) switch or a physical switch.

3. The portable terminal of claim 1, wherein the first antenna element is disposed at one end of the flexible display element and the second antenna element is disposed at another end of the flexible display element so that, when the flexible display element is folded, the first and second antenna elements are positioned to at least partially face each other.

4. The portable terminal of claim 3, further comprising:
   a circuit board disposed at one side edge of the flexible display element and provided with the communication circuit,
   wherein the first and second antenna elements extend from the opposite ends of the circuit board, respectively.

5. The portable terminal of claim 3, further comprising:
   a first circuit board disposed at one side edge of the flexible display element; and
   a second circuit board disposed at another side edge of the flexible display element,
   wherein at least one of the first circuit board and the second circuit board is provided with the communication circuit, and
   wherein the first antenna element extends from the first circuit board and the second antenna element extends from the second circuit board.

6. The portable terminal of claim 1, wherein the flexible display element comprises a display assembly that includes at least a partially flexible functional region.

7. The portable terminal of claim 1, wherein when the flexible display element is folded or rolled, the first antenna element forms a monopole antenna.

8. A portable terminal comprising:
   a flexible display element configured to being folded or rolled and including a first region and a second region which are capable of facing each other when the flexible display element is folded or rolled;
   a first antenna element disposed at the first region;
   a second antenna element disposed at the second region to face the first region;
   a switch element configured to selectively connect the second antenna element to one of the communication circuit and ground of the portable terminal; and
   a circuit board disposed in a central part of the flexible display element and provided with the communication circuit,
   wherein, when the flexible display element is unfolded or unrolled, the switch element connects the second antenna element to the one of the communication circuit and the ground such that the first antenna element and the second antenna element carry out a transmission/reception operation independently from each other,
   wherein, when the flexible display element is folded or rolled, the first and second antenna elements at least partially overlap each other, and the switch element is in an open state and disconnects the second antenna element from the one of the communication circuit or the ground such that only the first antenna element carries out a transmission/reception operation, and
   wherein the flexible display element is folded on the circuit board, and the first and second antenna elements are radiation patterns that extend from the circuit board to be farther apart from each other and are arranged one side edge of the flexible display element.

9. A portable terminal comprising:
   a flexible display element configured to being folded or rolled and including a first region and a second region which are capable of facing each other when the flexible display element is folded or rolled;
   a first antenna element disposed at the first region;
   a second antenna element disposed at the second region to face the first region; and
   a switch element configured to selectively connect the second antenna element to one of the communication circuit and ground of the portable terminal,
   wherein, when the flexible display element is unfolded or unrolled, the switch element connects the second antenna element to the one of the communication circuit and the ground such that the first antenna element and the second antenna element carry out a transmission/reception operation independently from each other, and wherein, when the flexible display element is folded or rolled, the first and second antenna elements at least partially overlap each other, and the switch element is in an open state and disconnects the second antenna element from the one of the communication circuit or the ground such that only the first antenna element carries out a transmission/reception operation, wherein the portable terminal further comprising:
a first circuit board disposed at one end of the flexible display element; and
a second circuit board disposed at another end of the flexible display element, and positioned to face the first circuit board when the flexible display element is folded, wherein at least one of the first circuit board and the second circuit board is provided with the communication circuit, and wherein the first antenna element extends from the first circuit board and the second antenna element extends from the second circuit board, and wherein the first and second antenna elements are disposed at one side edge of the flexible display element, and the first and second circuit boards extend to approach each other.

10. A portable terminal comprising:
a flexible display element configured to being folded or rolled and including a first region and a second region which are capable of facing each other when the flexible display element is folded or rolled;
at least one circuit board provided with a ground and communication circuit;
a first antenna element disposed at the first region;
a second antenna element disposed at the second region; and
a switch element configured to selectively actuate between a plurality of states, wherein, when the flexible display element is unfolded or unrolled, the switch element is actuated to a first state such that the second antenna element is connected to the ground or the switch element is actuated to a second state such that the second antenna element is connected to the communication circuit, wherein the first antenna element and the second antenna element carry out a transmission/reception operation when the switch element is actuated to the first state or the second state, wherein, when the flexible display element is folded or rolled, the first and second antenna elements at least partially overlap each other, and the switch element is actuated to a third state different from the first state or the second state such that the second antenna element is disconnected from the ground or the communication circuit, wherein only the first antenna element carries out a transmission/reception operation when the switch element is actuated to the third state, and wherein the first state and the second state are associated with a closed state of the switch element and the third state is associated with an open state of the switch element.

11. The portable terminal of claim 10, wherein the switch element is an electrical element including a Single Pole Double Throw (SPDT) switch or a physical switch.

12. The portable terminal of claim 10, wherein the first antenna element is disposed at one end of the flexible display element and the second antenna element is disposed at another end of the flexible display element so that, when the flexible display element is folded, the first and second antenna elements are positioned to at least partially face each other.

13. The portable terminal of claim 12,
wherein a first circuit board is disposed at one side edge of the flexible display element, and
wherein the first and second antenna elements extend from the opposite ends of the first circuit board, respectively.

14. The portable terminal of claim 12,
wherein a first circuit board is disposed at one side edge of the flexible display element and a second circuit board comprising the ground and the communication circuit is disposed at another side edge of the flexible display element, and
wherein the first antenna element extends from the first circuit board and the second antenna element extends from the second circuit board.

15. The portable terminal of claim 10, wherein the flexible display element comprises a display assembly that includes at least a partially flexible functional region.

16. A portable terminal comprising:
a flexible display element configured to being folded or rolled and including a first region and a second region which are capable of facing each other when the flexible display element is folded or rolled;
at least one circuit board provided with a ground and communication circuit;
a first antenna element disposed at the first region;
a second antenna element disposed at the second region; and
a switch element configured to selectively actuate between a plurality of states, wherein, when the flexible display element is unfolded or unrolled, the switch element is actuated to a first state such that the second antenna element is connected to one of the ground and the communication circuit, wherein the first antenna element and the second antenna element carry out a transmission/reception operation when the switch element is actuated to the first state, wherein, when the flexible display element is folded or rolled, the first and second antenna elements at least partially overlap each other, and the switch element is actuated to a second state different from the first state such that the second antenna element is disconnected from the one of the ground and the communication circuit, wherein only the first antenna element carries out a transmission/reception operation when the switch element is actuated to the second state, and wherein the first state is associated with a closed state of the switch element and the second state is associated with an open state of the switch element, wherein a first circuit board of the at least one circuit board comprising the ground and the communication circuit is disposed in a central part of the flexible display element, and wherein the flexible display element is folded on the first circuit board, and the first and second antenna elements are radiation patterns that extend from the first circuit board to be farther apart from each other and are arranged one side edge of the flexible display element.

17. A portable terminal comprising:
a flexible display element configured to being folded or rolled and including a first region and a second region which are capable of facing each other when the flexible display element is folded or rolled;
at least one circuit board provided with a ground and communication circuit;
a first antenna element disposed at the first region;
a second antenna element disposed at the second region; and
a switch element configured to selectively actuate between a plurality of states,
wherein, when the flexible display element is unfolded or unrolled, the switch element is actuated to a first state such that the second antenna element is connected to one of the ground and the communication circuit, wherein the first antenna element and the second antenna element carry out a transmission/reception operation when the switch element is actuated to the first state,
wherein, when the flexible display element is folded or rolled, the first and second antenna elements at least partially overlap each other, and the switch element is actuated to a second state different from the first state such that the second antenna element is disconnected from the one of the ground and the communication circuit,
wherein only the first antenna element carries out a transmission/reception operation when the switch element is actuated to the second state, and
wherein the first state is associated with a closed state of the switch element and the second state is associated with an open state of the switch element
wherein a first circuit board of the at least one circuit board is disposed at one end of the flexible display element and a second circuit board of the at least one circuit board comprising the ground and the communication circuit is disposed at another end of the flexible display element, and positioned to face the first circuit board when the flexible display element is folded,
wherein the first antenna element extends from the first circuit board and the second antenna element extends from the second circuit board, and
wherein the first and second antenna elements are disposed at one side edge of the flexible display element, and the first and second circuit boards extend to approach each other.

* * * * *